UNITED STATES PATENT OFFICE 2,326,849

PAPER SIZING MATERIAL

George B. Fowler and Donald K. Pattilloch, Springfield, Mass.; said Pattilloch assignor to Chemical Development, Inc., Chicago, Ill., a corporation of Illinois No Drawing. Application September 27, 1941, Serial No. 412,691

9 Claims. (Cl. 106—80)

The present invention relates to an improved form of paper sizing material, particularly of the type which is precipitable in a paper beater by means of paper maker's alum and which, by reason of its constitution, presents many advantages over the materials hitherto employed for this purpose.

Broadly speaking, the present invention primarily concerns a paper-sizing material which may be furnished, if desired, in dry powdered form, or may be supplied in the form of a solution or dispersion, and which comprises, among its essential components, starch, some form of rosin or rosin size, and an alkali silicate having an $M_2O$ to $SiO_2$ ratio of at least 1:1, which silicate is exemplified by the group consisting of the metasilicates and the sesquisilicates.

The invention furthermore involves the method of sizing paper while at the same time enhancing the chemical hydration effect by the conjoint precipitation onto the paper fibers, while suspended in water, of some form of rosin size as well as starch.

The invention further includes methods for the preparation of the sizing material of the present invention, all as will be described in greater detail hereinbelow, from which description the further objects of the invention will become manifest.

It has already been proposed in the past to precipitate various forms of starch or starchy materials onto paper fibers, either in the beater or in the subsequent stages of paper manufacture, as for example by placing some form of gelated starch in the beater and, after the dilution of the thus resulting furnish, precipitating the starch by the production in the furnish, at a suitable point in the process, of a positively charged precipitate derived from, for example, sodium aluminate and aluminum sulfate or from sodium metasilicate and aluminum sulfate. Moreover, the present applicants, in their applications Serial Nos. 412,604, 412,605 and 412,606, all filed September 27, 1941, show that very desirable results in the production of a chemical hydration effect can be obtained by incorporating with a paper furnish a starch or starch product which has been gelated by means of an alkali silicate having an $M_2O$ to $SiO_2$ ratio of at least 1:1, namely, such silicates as sodium metasilicate and sodium sesquisilicate. The present applicants have found that starch gelated by this means is converted into a particularly easily precipitable state when permitted to react with aluminum sulfate or the like, whereby a complex precipitate is obtained, which throws down the starch and causes it to adhere to the paper fibers, thereby endowing them with a greater degree of slowness on the paper machine or, as it is sometimes called, increasing the hydration effect.

The present invention is to be distinguished from the prior proposals of others, as well as from applicants' work exemplified by the aforementioned applications for Letters Patent, in that the applicants have also discovered that very superior results both as to sizing and starch precipitation can be obtained by employing a mixture of an alkali silicate, such as metasilicate or sesquisilicate, with a rosin size or even raw rosin, whereby the rosin is either saponified or at least aqueously dispersed while at the same time the starch is gelated. Thus, for example, they may proceed by dissolving sodium metasilicate in water and then dispersing into the resulting solution some form of rosin or rosin size in a state of uniform comminution, whereby the rosin becomes partly saponified or, at any rate, uniformly and finely dispersed in the metasilicate solution. The resulting mixture may then be employed for gelating starch in the cold, which may be accomplished for example by stirring starch rapidly into the solution or else by suspending starch separately in water and effecting a commingling of the starch suspension with the rosin-metasilicate suspension. By choosing the proper proportions, as will hereinafter be set forth in greater detail, there will result a gelation or swelling of the starch, with a resulting rupturing of the amylocellulose membranes surrounding the individual starch grains, so that the amylose itself will combine with the water. It will be apparent that, by virtue of the already existing even distribution of the rosin, these rosin particles of submicroscopic size will orient themselves on or about the individual starch micelles, thus producing a colloidal complex, the exact nature of which is difficult to explain. However, if such a rosin-metasilicate starch complex is added to a beater containing paper fibers and is precipitated therein by the means of an adequate quantity of an acid reacting salt, for example, aluminum sulfate, a series of complex reactions will take place, whereby not only will the size be precipitated but the starch will be rendered substantially insoluble and caused to adhere, together with the size, to the suspended paper fibers. The result is not only an excellent sizing of the paper but also the production of the desired hydration effect, all in one single operation. The advantage of this will, of course, immediately be apparent to the experienced paper maker. The aforementioned example, however, by no means exhausts the ramifications and possibilities of the invention.

Another method of proceeding is to produce a dry mixture of air-dry starch, sodium metasilicate pentahydrate, which is a dry free-flowing substance, and ordinary powdered rosin, the so-called gum rosin or wood rosin of commerce. Suitable proportions may be as follows:

*Formula 1*

| | Parts |
|---|---|
| Air-dry starch | 40 |
| Powdered rosin | 20 |
| Granular or powdered sodium metasilicate | 30–40 |

*Formula 2*

| | Parts |
|---|---|
| Air-dry starch | 40 |
| Dry rosin size (of commerce) | 15–25 |
| Granular or powdered sodium metasilicate | 30 |

*Formula 3*

| | Part |
|---|---|
| Air-dry starch | 1 |
| Powdered ordinary rosin | 1 |
| Granular or powdered sodium metasilicate | 1 |

In the above formulas all of the parts are by weight.

In order to avoid the necessity of circumlocution, it may be stated at this point that sodium sesquisilicate, which has a ratio of $Na_2O$ to $SiO_2$ of 1.5:1, may be substituted for the sodium metasilicate, using such an amount of sodium sesquisilicate as will be equivalent in $Na_2O$ content to the sodium metasilicate. In all of the discussion hereinafter, as well as in the claims, it is to be understood that when metasilicate is mentioned the applicants reserve the right to the doctrine of equivalents to cover the sesquisilicate as well as mixtures of the metasilicate with the sesquisilicate.

It might be pointed out in passing that there is a fundamental and important difference between the ordinary silicate sirups of commerce and the silicates employed by the present applicants. Silicate sirups without exception contain a greater molar ratio of silicon dioxide to sodium oxide than do the silicates employed by the applicants. The silicate sirups moreover are insufficiently alkaline themselves to gelate starch in the cold, irrespective of the amounts of such silicates which may be permitted to act upon the starch. Thus, for example, the ionization of these sodium silicate solutions, so far as the hydroxyl ion is concerned, is greatly inferior to that of either the metasilicate or sesquisilicate, so that the silicate sirups may be said to have an insufficient alkalinity to effect the gelation of the starch in the cold.

As pointed out in the applicants' copending application Serial No. 412,606, while it is true that starch may be gelated by means of sodium hydroxide, they have found that starch so gelated is substantially useless for the purpose of the engine sizing of paper, because such starch is substantially unprecipitable by means of aluminum sulfate or the like. However, starch which has been gelated by means of the alkali metasilicates or sesquisilicates is perfectly precipitable in a beater or at some subsequent stage in the paper-making process, all as fully set forth in the applicants' copending application hereinabove mentioned.

As an exemplification of another method of carrying out the present invention, a modified form of rosin size may be prepared, for example by partially saponifying rosin, either in the cold or in a heated condition, by means of an aqueous solution of sodium metasilicate or sodium sesquisilicate, thus producing what might be called, for the purposes of the present discussion, a metasilicated rosin size, using for this purpose a sufficient excess of the metasilicate or sesquisilicate so that the mixture will be sufficiently alkaline to gelate starch which comes in contact with it. Into such a metasilicated rosin size solution one may introduce either dry starch or a starch milk produced by suspending starch in a sufficient quantity of water, the mixture then being stirred until the desired gelation of the starch takes place. As to the proportions, the amounts mentioned in connection with the dry mixtures of Formulas 1, 2 and 3 will be effective, without, however, changing the relative amounts to be dissolved in water.

As a more detailed example, one may suspend 40 parts of starch and 20 parts of powdered rosin in 480 parts of water, all by weight, and then dissolve, say, 28 to 40 parts of sodium metasilicate in 120 parts of water and, when dissolved, commingle the two solutions by pouring one into the other or both of them into a third vessel, sufficient agitation being provided to cause a rapid and uniform admixture of the materials. Under these conditions, the metasilicate will disperse the size, as this reaction is fairly rapid. The gelation of the starch then follows, the results hereinabove described thus being effected.

An alternative proceeding is to make a dry mixture of starch and rosin and then to dissolve the required amount of sodium metasilicate in water, rapidly stirring the mixture of starch and rosin into the water. By reason of the rapid wetting action which metasilicate solutions have, the starch and rosin will be rapidly dispersed, follower by gelation of the starch in the same manner as already described. In other words, the precise order of addition is of no particular importance except that one thing is to be avoided: One cannot first gelate the starch with the metasilicate and then hope adequately to disperse powdered rosin in the mixture, for the rosin will tend to ball up and form a lumpy mixture. However, if the metasilicate is first allowed to contact the rosin, so that this will be dispersed in the solution, the gelation can well follow as a subsequent step in the operation.

Still another method of practicing the present invention is to saponify or disperse rosin or rosin size in a metasilicate solution and then to spray-dry the mixture to obtain a dry powder which may then be mixed with dry starch to form one modification of the product of the applicants' present invention.

From a commercial point of view, a dry mixture constituted substantially in conformance with Formulas 1, 2 and 3, or reasonable modifications thereof, is the preferred embodiment, as it forms a material which can be sold to paper manufacturers with simple directions for dissolving it in an adequate amount of water, namely, in the proportion of from 400 to 700 parts by weight of water to 100 parts of the mixture.

As a further guide to adequate proportioning, it may be stated that the amount of water should be approximately fifteen times by weight of the starch content of the composition. The amount of sodium metasilicate, using in this case the dry granular pentahydrate as a basis for calculations, should be approximately in the ratio of 4 parts of starch to from 2.5 to 4 parts of sodium metasilicate. In any event, a sufficient quantity of metasilicate should be employed to obtain gelation of the starch within a period of, say, not exceeding a half hour.

The starches employed in the present invention may be any of the following: potato starch, cornstarch, rye starch, wheat starch, sago starch, tapioca starch, cassava starch, arrowroot starch, and other forms of this commodity. These starches are readily obtainable. The parts by weight mentioned are predicated upon ordinary air-dry starch which contains anywhere from 10% to 14% of moisture when in equilibrium with the ordinary atmosphere.

The rosin or rosin size may be any form of this commodity which is available on the market. Thus it may be that type known as gum rosin, or it may be wood rosin or various types of colophony procurable from dealers in naval stores, or it may be dry or wet commercial so-called rosin size, which is a partially saponified form of rosin. When using rosin in the dry form, it is preferable that it be finely powdered, say, 100 mesh or smaller. However, cooking the rosin with a sodium metasilicate solution may be resorted to, in which case the rosin need not be so finely divided. The rosin size, on the other hand, may be any commercial form of this commodity, thus even one containing a certain amount of wax. It may be the so-called dry rosin size which is usually the sodium salt of abietic acid, commonly containing a considerable excess of uncombined rosins and esters, or it may be in the form of a rosin size emulsion or rosin emulsion, all of which are commercial forms obtainable on the market. It will be evident, however, that where dry materials are given in the formulas, some form of dry rosin or dry rosin size will have to be employed. However, if the invention is practiced in the wet manner, the wet or liquid commercial forms of rosin size may be employed.

The alkali silicates employed are those from the group consisting of the metasilicates and the sesquisilicates but, by reason of cost, are practically restricted to the sodium salts, although of course the invention may be practiced with the corresponding potassium salts, which however, because of expense, are probably not the most desirable.

The amount of alum or aluminum sulfate required for effecting the precipitation can readily be calculated by those familiar with paper-making technique, but it may be stated that sufficient alum or aluminum sulfate should be employed to produce a condition of acidity in the beater corresponding to a pH of anywhere between 4.2 and 5.8. Under these conditions it will be found unnecessary to employ a secondary coagulation process or subsequent pH control, as has sometimes been practiced by the applicants as well as by others, because the action of the aluminum sulfate on the material of the present invention produces a sufficiently complete precipitation of both the rosin and the starch to obviate the necessity for such control or secondary coagulation. Acid reacting salts which are the equivalent of aluminum sulfate may be used in place of the alum. Examples are iron (ic) sulfate and chloride.

Saving for themselves such equivalents as will occur to those skilled in the art to which this invention appertains, the applicants claim:

1. A precipitable sizing material comprising a mixture of substantial quantities each of starch, rosin and an alkali silicate from the group consisting of metasilicate and sesquisilicate.

2. A precipitable sizing material comprising a mixture of substantial quantities each of starch, rosin size and an alkali silicate from the group consisting of metasilicate and sesquisilicate.

3. A precipitable sizing material comprising a dry mixture of about 40 parts by weight of air-dry starch, 20 parts by weight of rosin, and 40 parts by weight of sodium metasilicate pentahydrate.

4. A precipitable sizing material comprising a dry mixture of about 40 parts by weight of air-dry starch, 20 parts by weight of dry rosin size, and about 30 parts by weight of sodium metasilicate pentahydrate.

5. A precipitable sizing material comprising substantially equal parts by weight of starch, rosin size and sodium metasilicate.

6. Process of producing a precipitable paper-sizing material which comprises simultaneously saponifying substantial quantities of rosin and gelating substantial quantities of starch in an aqueous medium by means of a sufficient amount of an alkali silicate from the group consisting of metasilicates and sesquisilicates.

7. Process of producing a precipitable paper-sizing material which comprises saponifying substantial quantities of rosin by means of a sufficient excess of sodium metasilicate so as to obtain an alkaline reacting rosin dispersion capable of gelating starch in the cold, and gelating a substantial quantity of starch therewith.

8. Process of producing a precipitable paper-sizing material which comprises gelating starch in an aqueous medium by means of an alkali-metasilicate-saponified rosin size.

9. Process of producing a precipitable paper-sizing material which comprises suspending substantial quantities of rosin and of starch in an aqueous solution of an alkali silicate from the group consisting of metasilicate and sesquisilicate until the starch has been gelated and the rosin dispersed.

GEORGE B. FOWLER.
DONALD K. PATTILLOCH.